Sept. 3, 1957
H. BURR
2,805,179
ELECTRIC CABLE
Filed May 5, 1953
4 Sheets-Sheet 1
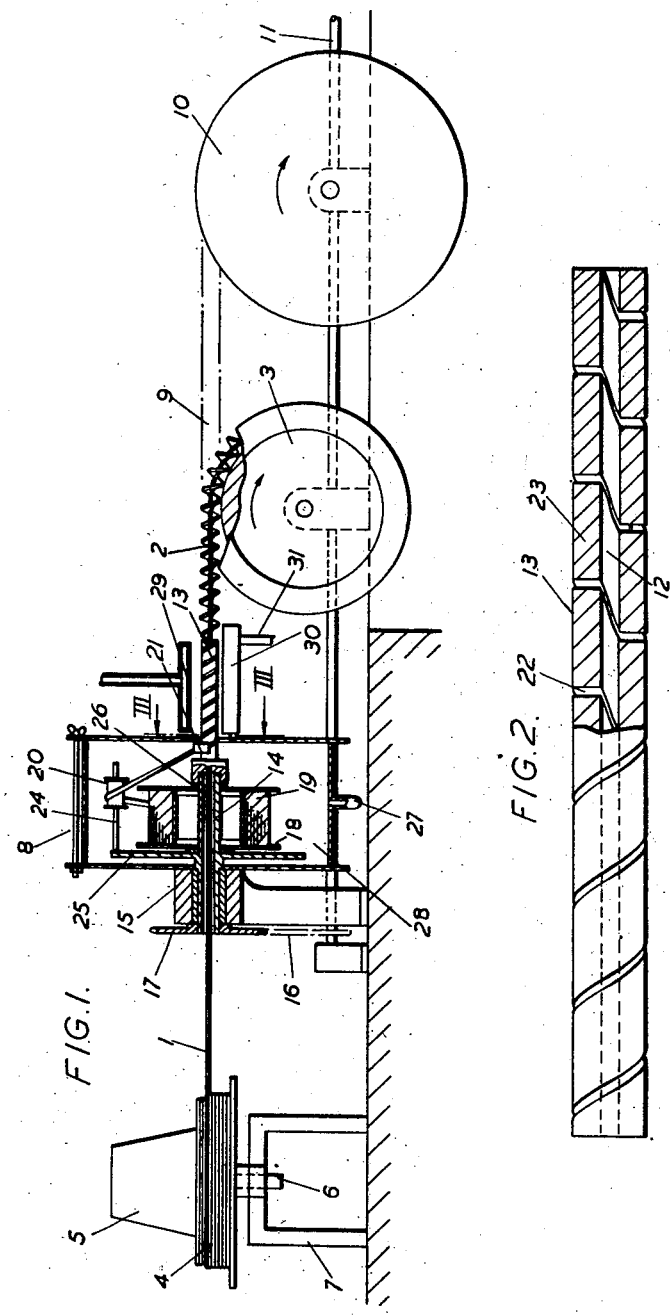
Inventor
Harvey Burr
By
Webb Mackey & Burden
Attorney Sept. 3, 1957 H. BURR 2,805,179
ELECTRIC CABLE
Filed May 5, 1953 4 Sheets-Sheet 2
FIG. IA.
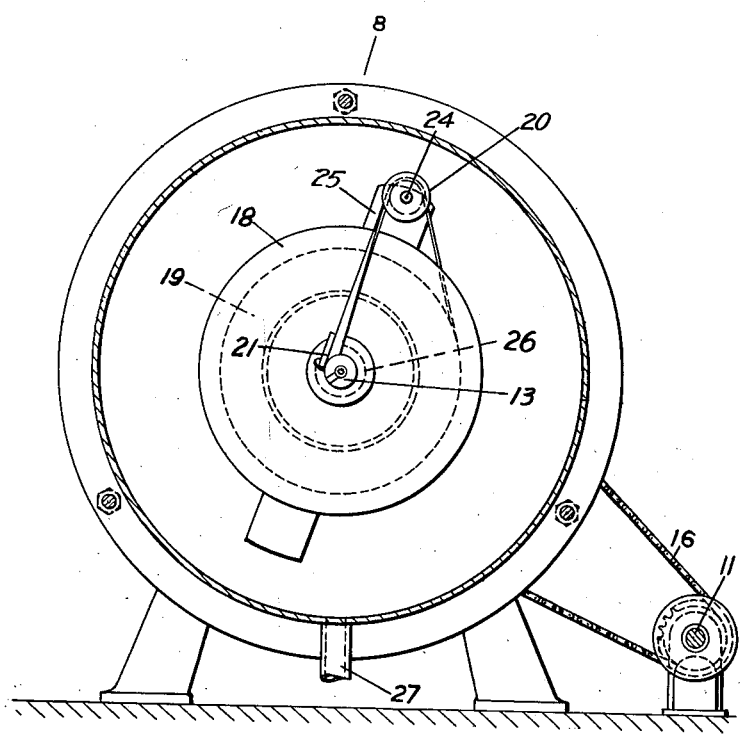
Inventor
Harvey Burr
By
Webb Mackey + Burden
Attorney

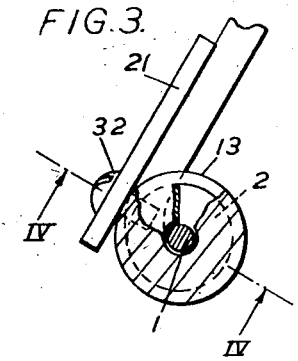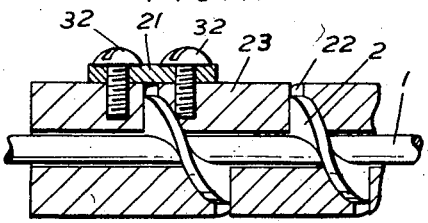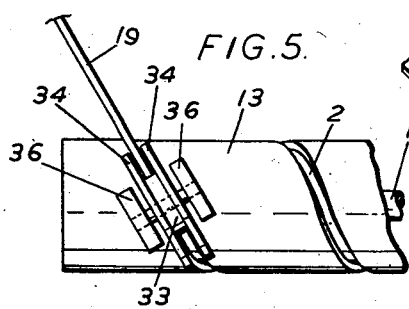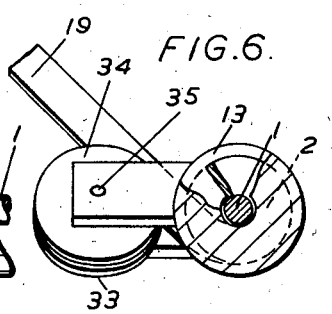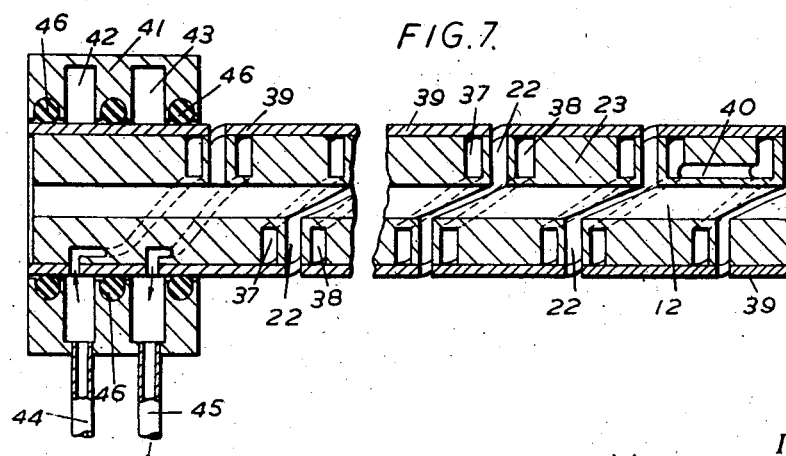

Sept. 3, 1957 H. BURR 2,805,179
ELECTRIC CABLE
Filed May 5, 1953 4 Sheets-Sheet 4

Inventor
Harvey Burr
By
Webb Mackey & Burden
Attorney

United States Patent Office 2,805,179
Patented Sept. 3, 1957

2,805,179

ELECTRIC CABLE

Harvey Burr, Liverpool, England, assignor to British Insulated Callender's Cables Limited, London, England, a British company Application May 5, 1953, Serial No. 353,173

Claims priority, application Great Britain May 12, 1952

12 Claims. (Cl. 154—2.26)

The invention is concerned with the manufacture of a co-axial conductor electric cable for high frequency signal transmission. It is known to separate the two conductors of such a cable by a strip of insulating material arranged as a helical open-turn winding on the inner conductor, the strip extending radially from the conductor. This invention provides an improved method and apparatus for making such an insulating support of thermoplastic insulating material for instance, polyethylene.

A strip of thermoplastic insulant is fed continuously to a helical mould cavity concentric with and rotated about the conductor. The conductor passes continuously through an axial passage in the mould. The mould cavity opens into the axial passage to permit the strip to engage the conductor surface. The leading end of the strip is anchored to the conductor and the strip is wound into the helical form in the mould by supply means rotating about the conductor at the same speed of rotation and in the same sense as the mould. The strip supply means may be a reel of strip revolving bodily about the conductor, or a rotatable guide which unwinds the strip from a reel arranged co-axial with the conductor. The strip is heated at or near its entry to the mould to soften it sufficiently to enable it to be moulded to the required form, and the moulded helix passes through a cooling zone as it advances with the conductor. The heating zone may be in the mould itself and/or in the path of the strip approaching the mould, and/or the strip may be heated before it leaves the reel. The cooling may be effected, before or soon after the strip leaves the mould, by a copious flow of fluid. The cooling fluid may be circulated within closed passages in the mould itself where it is desirable to keep the fluid out of contact with the material of the strip.

The width of the mould cavity is somewhat greater than the initial thickness of the strip, because the thickness of that portion of the strip in contact with the conductor is increased as it is formed into the helix. The mould cavity may be a helical slot formed in a bar which is axially apertured to permit the passage of the conductor. Alternatively the mould cavity may be a helical slot between two co-axial helical strips of metal. Roller or other guides may be provided to assist the entry of the strip into the helical mould, and a cover may be provided over the first portion of the mould to ensure that the strip does not rise out of it.

In another arrangement the mould may be provided by a double series of rollers mounted with their axes radial to the inner conductor and on helical paths having a pitch equal to that of the helix to be made, the distance between the two series of rollers being appropriately greater than the initial thickness of the strip.

Where the strip is fed from a reel a device may be provided to apply a light controllable braking force, to maintain the strip under sufficient tension not great enough to cause the strip to be broken or appreciably stretched. Where, for instance, the helix is made of polyethylene on a wire of about 0.2 in. diameter, the overall diameter of the helix being about 0.75 in. the initial thickness of the strip may be 0.075 in. and the mould width 0.1 in. Raising the temperature of the strip to 100° C. just before it enters the mould is sufficient to provide the appropriate softening of the material.

Two or more strips may be applied as parallel spaced helices on the conductor by using a mould having the appropriate number of mould cavities each in conjunction with a strip-feeding arrangement.

Arrangements in accordance with the invention are described hereinafter by way of example and with reference to the accompanying drawings wherein:

Figure 1 is a diagrammatic part sectional view of one form of apparatus;

Figure 1A is a part-sectional view in the direction of the arrows III in Figure 1, and to a larger scale, of part of the apparatus shown in that figure;

Figure 2 is a part sectional view of the mould used in the arrangement shown in Figure 1 to a larger scale;

Figure 3 is a section through the mould as seen in the direction of the arrows III—III in Figure 1;

Figure 4 is a sectional view of the arrangement shown in Figure 3 on the line IV—IV as seen in the direction of the arrows;

Figures 5 and 6 represent a modification of the arrangement shown in Figures 3 and 4;

Figure 7 is a sectional view of a modified mould;

Figure 8:
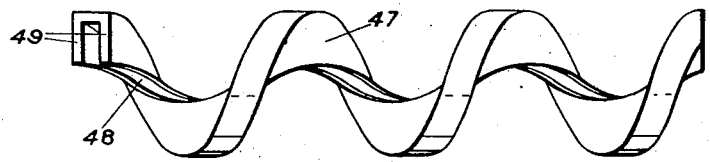
Figures 8 and 9 are side elevations of parts of other forms of the mould.

In the arrangement shown in Figures 1 and 1A the wire 1 to which a helical insulated spacer strip 2 is to be applied is drawn by means of a capstan 3 from a coil 4 carried on a swift 5 rotatable about a vertical spindle 6 on a support 7 in the usual manner. The wire 1 is drawn through an applicator head 8 in which the helical open turn winding 2 of strip is applied. The insulated wire 9 passes around the capstan 3 in the usual manner and then goes to the take-up drum 10, the capstan 3 and take-up drum 10 being driven from a common driving shaft 11. In its passage through the applicator head 8 the wire 1 is drawn through the axial passage 12 in a tubular mould 13. The mould 13 is attached to the end of a hollow spindle 14 which is supported at the rearward end in a bearing 15. The spindle 14 with the mould 13 attached is rotated about its axis, that is about the path of the wire, by a chain drive 16 from the driving shaft 11 to a chain wheel 17 fixed to the hollow spindle 14. The gear relation between the drive to the capstan 3 and that to the hollow spindle 14 is such that the latter rotates once for each pitch length of the helix 2. Mounted on the hollow spindle 14 and co-axial therewith is a reel 18 of polythene strip 19. The end of the strip 19 is carried over a guide pulley 20 and under a cover plate 21 (see Figure 3) into the beginning of a helical slot 22 formed in the wall 23 of the mould tube 13. The guide pulley 20 is rotatable on an arm 24 extending parallel to the path of the wire 1 from a radial arm 25 fixed to the hollow shaft 14. During the operation of the machine the strip 19 is gradually drawn from the reel 18 which rotates on the hollow shaft 14. A friction brake 26 prevents overrunning of the reel 18 but is insufficient to restrict its rotation since the strip 19 would be stretched if this braking force was too great. At the start of the operation the leading portion of the strip 19 is wrapped by hand about the wire 1 in the helical slot 22 and bound in position. Thereafter the rotation of the guide pulley 20 and mould tube 13 continues to wind the strip into the required helical form. The hand made portion is subsequently discarded. The helical slot forms a mould cavity opening to the outside and inside surfaces of the mould tube 13 so that the strip 19 is wound helically on the wire. It will be seen that as the wire with the helical strip 2 on it is drawn from the mould 13 by the capstan 3 the action will be to continuously unscrew the mould 13 from the helix 2 which has been formed within it.

It is necessary to soften the strip 19 slightly to enable it to be easily bent into the helical form and for this purpose warm fluid, e. g. air or steam, is fed through an inlet pipe 27 to the inside of a fixed casing 28 which encloses the reel 18 and the point at which the strip 19 meets the mould 13. The warm fluid escapes through a clearance opening where the mould 13 extends to the outside of the casing 28. The part of the mould 13 projecting outside the casing 28, and consequently the plastic material within it, is cooled by means of a water-spray 29 above the mould 13, surplus water being collected in a tray 30 and carried away through a waste pipe 31.

The width of the helical mould cavity 22 is somewhat greater than the initial thickness of the strip 19 because the thickness of that portion of the strip which comes into contact with the conductor 1 is increased as it is formed into the helix.

The strip 19 enters the helical mould cavity 22 under the cover plate 21 fixed to the mould by means of screws 32 and extending tangential to the cylindrical surface of the mould, as shown in Figures 3 and 4. Alternatively, as shown in Figures 5 and 6, the strip may be guided into the mould cavity by passing under a freely rotatable guide roller 33. The roller 33 comprises two comparatively deep flanges 34, 34 and is rotatable on a spindle 35 mounted between supporting side plates 36, 36 fixed to the outside of the mould 13. The axis of rotation of this roller 33 lies at right angles to the direction of entry of the strip 19.

In Figure 7 there is shown a modified form of mould by means of which the moulded helix may be cooled without being wetted. The mould wall contains two helical cooling channels 37, 38 disposed one on each side of the moulding cavity. They are conveniently made by cutting into the wall 23 of the mould from the outside. They do not extend to the central passage 12 and are subsequently closed by means of a sleeve 39 through the wall of which the moulding cavity 22 extends. The cooling passages 37, 38 are connected at the forward end of the mould by a short-circuiting passage 40. At the inner end, the mould 13 rotates within a fixed gland box 41 containing two annular chambers 42, 43. One of these, the inlet chamber 42, is fed with cooling fluid through an inlet pipe 44 and from this the cooling fluid enters into one helical cooling passage 37. The other annular chamber 43 comprises the exhaust chamber and cooling fluid passing from the second helical passage 38 into this chamber is taken away through the exhaust pipe 45. A running fluid-tight joint between the gland box 41 and the mould 13 is provided by three packing rings 46.

Figure 8 shows an alternative form of mould consisting of a single helical U section member. The mouth 48 of the section opens towards the axis, and the sides 49 determine the width of the mould cavity. In this arrangement the moulded strip is completely enclosed.

Figure 9:
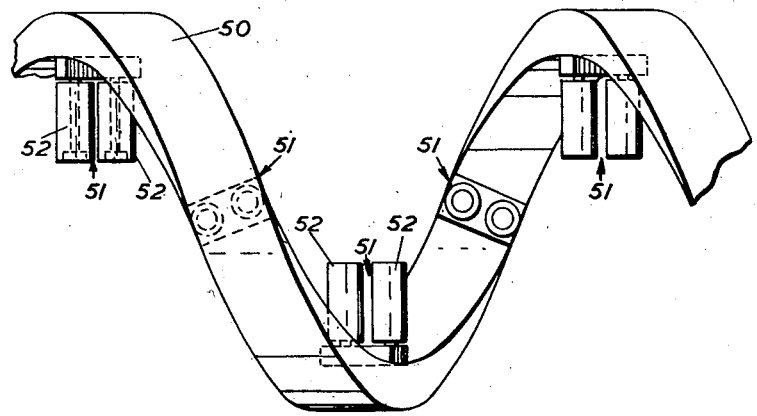
Figure 10:
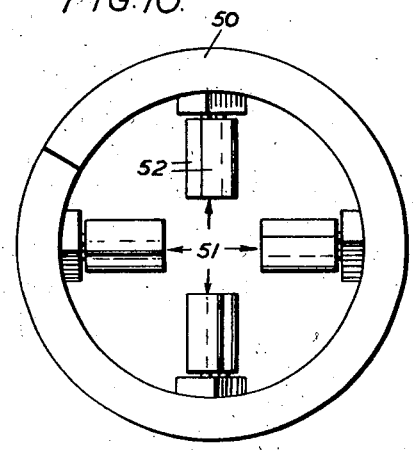
Figure 10 is an end view of the arrangement shown in Figure 9.

In Figures 9 and 10 the mould consists of a helical bar 50 having pairs 51 of freely rotatable rollers 52 at equally spaced intervals projecting radially inwards from its inner surface. The axes of the rollers 52 extend radial and between them the rollers guide the strip, while soft, into the helical form.

All the arrangements shown are designed to produce an insulating helix in the form of a single start thread. It will be clear that the insulation can be in the form of two or more start threads comprising the appropriate number of co-axial helices. For this purpose the mould would be provided with the appropriate number of helical mould cavities or guides and the appropriate number of reels of strip will be mounted in the applicator head.

The strip supply reel may also be mounted with its axis eccentric to the axis of the wire, the reel being carried bodily round the wire during the process. It may also be arranged that the friction brake is adjustable automatically by means which is responsive to the tension in the strip. For instance the strip 19 may be taken from the reel to the guide 20 over a spring-biased arm, which, when the strip tension increases beyond a predetermined value, will move and appropriately adjust the brake. The mould may be cooled by means of an air blast or the air blast may be applied after the water cooling arrangement, shown in Figure 1, to dry the helix.

Although the insulated wire is shown in Figure 1 as passing directly to the reeling means it may be first taken through arrangements for applying an outer lapping or lappings of insulating and/or conducting material.

What I claim as my invention is:

1. Apparatus for applying a flat thermoplastic strip about a longitudinally advancing wire as an open-turn helical fin in contact with, and extending radially from, the wire, comprising a mould co-axial with and rotatable about the path of the wire, axially separated parts of said mould extending helically to define between them a helical passage which is open throughout the length of the mould to the path of the wire and providing opposed radially extending support-surfaces for the major surfaces of the strip, rotatable means for supporting a supply of strip and means for guiding the strip as it is drawn by the wire from the supply into and through said helical passage, means for rotating the guiding means and mould together, and heating means for softening the strip at its entry to said helical passage.

2. Apparatus for applying a flat thermoplastic strip about a longitudinally advancing wire as a open-turn helical fin in contact with, and extending radially from, the wire, comprising a mould co-axial with and rotatable about the path of the wire, axially separated parts of said mould extending helically to define between them a helical passage which is open throughout the length of the mould to the path of the wire and providing opposed radially extending support-surfaces for the major surfaces of the strip, rotatable means for supporting a supply of strip and means for guiding the strip as it is drawn by the wire from the supply into and through said helical passage, means for rotating the guiding means and mould together, heating means for softening the strip at its entry to said helical passage and means for cooling the mould.

3. Apparatus for applying a flat thermoplastic strip about a longitudinally advancing wire as an open-turn helical fin in contact with, and extending radially from, the wire, comprising a mould co-axial with and rotatable about the path of the wire, axially separated parts of said mould extending helically to define between them a helical passage which is open throughout the length of the mould to the path of the wire and providing opposed radially extending support-surfaces for the major surfaces of the strip, rotatable means for supporting a supply of strip and means for guiding the strip as it is drawn by the wire from the supply into and through said helical passage, means for rotating the guiding means and mould together, a heating chamber for housing the strip supply and guiding means and a cooling zone between the heating chamber and the end of the mould at which the strip leaves the mould.

4. Apparatus for applying a flat thermoplastic strip about a longitudinally advancing wire as an open-turn helical fin in contact with, and extending radially from, the wire, comprising a mould co-axial with and rotatable about the path of the wire, axially separated parts of said mould extending helically to define between them a helical passage which is open throughout the length of the mould to the path of the wire and providing opposed radially extending support-surfaces for the major surfaces of the strip, means for supporting a reel of strip co-axial with the path of the wire, said means allowing the reel to rotate on its axis as strip is drawn therefrom by the wire, means rotatable with the mould for guiding the strip from the reel into the helical passage, a heating chamber enclosing the reel and the strip guiding means, and means for cooling the strip in the mould.

5. Apparatus for applying a flat thermoplastic strip about a longitudinally advancing wire as an open-turn helical fin in contact with, and extending radially from, the wire, comprising a mould co-axial with and rotatable about the path of the wire, axially separated parts of said mould extending helically to define between them a helical passage which is open throughout the length of the mould to the path of the wire and providing opposed radially extending support-surfaces for the major surfaces of the strip, rotatable means for supporting a supply of strip and means for guiding the strip as it is drawn by the wire from the supply into and through said helical passage, means for rotating the guiding means and mould together, heating means at the entrance to the mould and, on the mould, a guide for directing the strip into the helical passage.

6. Apparatus as claimed in claim 5, the guide being a cover plate mounted on and tangential with the outer surface of the mould.

7. A method for applying a flat thermoplastic strip about a longitudinally advancing wire to form thereon an open-turn helical fin in contact with, and extending radially from, the wire, comprising drawing the strip continuously from a source of supply into a helical passage which is defined by two axially separated, helically extending parts of a mould co-axial with the path of the wire, bringing one edge of the strip into engagement with this wire throughout the length of the helical passage and supporting the strip, by means of opposed radially extending support-surfaces of the helical passage, with the major surfaces of the strip radial to the wire, rotating the mould and the source of supply together about the advancing wire, heating the strip to soften it at its entry to the helical passage, and drawing the helical strip continuously through the helical passage by the moving wire.

8. A method for applying a flat thermoplastic strip about a longitudinally advancing wire to form thereon an open-turn helical fin in contact with, and extending radially from, the wire, comprising drawing the strip continuously from a source of supply into a helical passage which is defined by two axially separated, helically extending parts of a mould co-axial with the path of the wire, bringing one edge of the strip into engagement with the wire throughout the length of the helical passage and supporting the strip, by means of opposed radially extending support-surfaces of the helical passage, with the major surfaces of the strip radial to the wire, rotating the mould and the source of supply together about the advancing wire, heating the strip to soften it at its entry to the helical passage, drawing the helical strip continuously through the helical passage by the moving wire, and cooling the strip after it has been wound about the wire.

9. Apparatus for applying a flat thermoplastic strip about a longitudinally advancing wire as an open-turn helical fin in contact with, and extending radially from, the wire, comprising a mould co-axial with and rotatable about the path of the wire, axially separated parts of said mould extending helically to define between them a helical passage which is open throughout the length of the mould to the path of the wire and to provide opposed radially extending support-surfaces for the major surfaces of the strip, rotatable means for supporting a supply of strip and means for guiding the strip as it is drawn by the wire from the supply into and through said helical passage, means for rotating the guiding means and mould together, heating means for softening the strip at its entry to said helical passage and the mould containing passages for the reception of a cooling fluid.

10. Apparatus for applying a flat thermoplastic strip about a longitudinally advancing wire as an open-turn helical fin in contact with, and extending radially from, the wire, comprising a mould co-axial with and rotatable about the path of the wire, axially separated parts of said mould extending helically to define between them a helical passage which is open throughout the length of the mould to the path of the wire and providing opposed radially extending support-surfaces for the major surfaces of the strip, rotatable means for supporting a supply of strip and means for guiding the strip as it is drawn by the wire from the supply into and through said helical passage, means for rotating the guiding means and mould together, heating means for softening the strip at its entry to said helical passage and a spray for directing a cooling fluid on to the exterior of the mould intermediate the points of entry and exit of the strip to and from the helical passage.

11. Apparatus for applying a flat thermoplastic strip about a longitudinally advancing wire as an open-turn helical fin in contact with, and extending radially from, the wire, comprising a mould co-axial with and rotatable about the path of the wire, said mould being a hollow cylinder divided into two co-axial helical members by a radially extending helical passage which extends between and opens into the inner and outer concentric surfaces of the cylinder, said two co-axial helical members providing opposed radial support-surfaces for the major surfaces of the strip, rotatable means for supporting a supply of strip and means for guiding the strip as it is drawn by the wire from the supply into said helical passage, means for rotating the guiding means and mould together, and heating means for softening the strip at its entry to the helical passage.

12. Apparatus for applying a flat thermoplastic strip about a longitudinally advancing wire as an open-turn helical fin in contact with, and extending radially from, the wire, comprising a mould co-axial with and rotatable about the path of the wire, said mould being two co-axial helices of equal inner and outer diameters and determining between them a radially extending helical passage which is open throughout its length to the path of the wire, said helices providing opposed radial support-surfaces for the major surfaces of the strip, rotatable means for supporting a supply of strip and means for guiding the strip as it is drawn by the wire from the supply into said helical passage, means for rotating the guiding means and mould together, and heating means for softening the strip at its entry to the helical passage.

References Cited in the file of this patent

UNITED STATES PATENTS

| | | |
|---|---|---|
| 1,996,951 | Clarke et al. | Apr. 9, 1935 |
| 2,065,561 | Boyle et al. | Dec. 29, 1936 |
| 2,446,057 | Morin | July 27, 1948 |
| 2,465,482 | Rhodes | Mar. 29, 1949 |
| 2,566,846 | Martin | Sept. 4, 1951 |
| 2,610,607 | Isenberg | Sept. 16, 1952 |

FOREIGN PATENTS

| | | |
|---|---|---|
| 575,745 | France | Apr. 26, 1923 |